United States Patent

[11] 3,550,717

| [72] | Inventor | James Franklin Doty, Jr.<br>Northfield, Ohio |
|---|---|---|
| [21] | Appl. No. | 758,264 |
| [22] | Filed | Sept. 9, 1968 |
| [45] | Patented | Dec. 29, 1970 |
| [73] | Assignee | Gulf Oil Corporation<br>Pittsburgh, Pa.<br>a corporation of Pennsylvania |

[54] AUTOMOTIVE SAFETY DEVICES
12 Claims, 3 Drawing Figs.

[52] U.S. Cl. .................................................. 180/103,
180/114; 200/61.45; 137/383
[51] Int. Cl. ...................................................... B60k 27/08
[50] Field of Search .......................................... 180/114,
104, 103, 82; 200/61.45—61.53; 137/383

[56] References Cited
UNITED STATES PATENTS

| 2,273,058 | 2/1942 | Miller | 180/104 |
|---|---|---|---|
| 2,637,407 | 5/1953 | Burk et al. | 180/114 |
| 2,692,652 | 10/1954 | Wilson | 180/104 |
| 2,891,628 | 6/1959 | Embry | 180/114 |
| 2,986,614 | 5/1961 | Minch | 200/61.5 |
| 3,174,502 | 3/1965 | Howarth et al. | (180/114UX) |
| 3,218,405 | 11/1965 | Young | 200/61.53 |
| 3,337,701 | 8/1967 | Prebilic | 200/61.45 |

*Primary Examiner*—Kenneth H. Betts
*Attorneys*—Meyer Neishloss, Deane E. Keith and William Kovensky ABSTRACT: Vehicular safety and security apparatus comprising a magnetically operated normally closed fuel line switch, the coil of which is wired in series with inertia responsive elements. In the event of a collision or other abnormal condition, at least one inertia responsive element will disable the vehicle's electrical system and the fuel line via the magnetic valve. In the event of an attempt to steal the vehicle by shorting the starter motor, the magnetic valve will still hold the fuel system disabled.

INVENTOR.
JAMES FRANKLIN DOTY, JR.

INVENTOR.
JAMES FRANKLIN DOTY, JR.

AUTOMOTIVE SAFETY DEVICES

The invention relates to vehicles, and particularly automobiles and trucks wherein it is desired to reduce the theft of such vehicles, and to increase the safety of using such vehicles as to fires resulting from spilled fuel and electrical sparks after a collision or other abnormal occurrence.

The invention comprises two portions, the first of which basically comprises a normally closed magnetic valve or relay positioned in the fuel line, or on the fuel tank, and connnected to the vehicle's electrical system in such a manner that it will permit the flow of fuel only when the ignition switch is in the "on" position, and will not permit any fuel to flow if the starter motor should be short circuited, as by a thief in an attempt to steal the vehicle, or in the event of a break in the vehicle's electrical system.

The second portion of the invention basically comprises a pair of double inertia responsive switches positioned in the vehicle's electrical system between the battery and the ignition switch in such a manner that any unusual force on the vehicle, such as by striking an object as in a collision, will cut off current to all other parts of the vehicle so as to eliminate loose, "hot" wires after an accident.

The two portions of the invention are wired together in series in the vehicle's electrical system so that in the event of a collision the first part of the apparatus will also operate to cut off fuel at the supply. Further, the second portion of the invention can be made so as to be manually operable, and by hiding said second portion the efforts of a thief in stealing the vehicle are further complicated since the flow of fuel to the engine is prevented. The thief must be aware that said second portion exists, and must be able to determine its manner of operation to unblock the fuel system.

Thus, an object of the invention is to provide vehicle safety and security apparatus of the character described which shall be simple and economical to manufacture, which shall be easy to install, highly reliable in operation, adaptable to virtually all vehicles, and yet practical and efficient to a high degree in use.

The above and other advantages of the invention will be pointed out or will become evident in the following detailed description and claims, and in the accompanying drawing also forming a part of the disclosure, in which:

Figure 1:
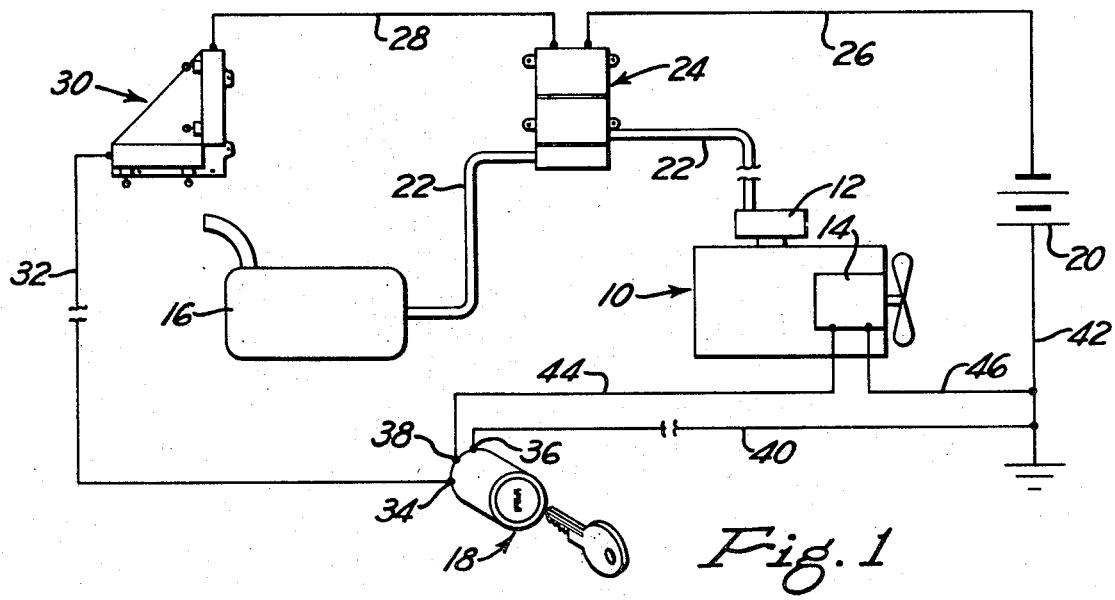
FIG. 1 is a schematic drawing of certain portions of a vehicle showing the invention installed.

Referring now in detail to the drawing, 10 designates the engine of a vehicle, not shown, with which the invention is being used. Engine 10 comprises a carburetor 12, and an electric starter motor 14. The vehicle also comprises a fuel tank 16, a key operated ignition switch 18, and a battery 20. A fuel line 22 interconnects carburetor 12 and fuel tank 16, and includes other usual means such as a fuel pump, fuel filter, and the like, well known to those skilled in the art, and omitted here for the sake of clarity. Interposed in fuel line 22 is the magnetic valve or relay 24 constituting the first portion of the invention.

The portion of the electrical system of the vehicle shown comprises a line 26 interconnecting the positive or "hot" terminal of battery 20 with one side of magnetic valve 24. Another line 28 interconnects the other terminal on the valve 24 with one side of a double inertia-responsive safety switch 30 comprising the second portion of the invention. A line 32 interconnects the other side of apparatus 30 with the "off" position or common contact 34 on ignition switch 18.

In current common usage, vehicular ignition switches comprise at least three terminals. There is a common terminal 34 to which the "hot line" or power is delivered from the battery and/or alternator or generator, an "on" or running position terminal 36, and a "start" position terminal 38. A line 40 extends from terminal 36 to a common ground for the battery 42. Many vehicular ignition switches also comprise a fourth or accessory position, which does not enter into the manner of operation of the present invention, and need not be explained here.

Various other electrically operated devices are connected to the various terminals in accordance with when it is desired that such devices be operable with respect to the position of the ignition switch. For example, the vehicle's headlights and horn will be connected to terminal 34 because it is desired that the headlights and horn operate whether or not the ignition switch is on or the engine is running. Other devices, such as the ignition distributor, and possibly a radio, might be connected to terminal 36 so that these devices would only work when the ignition switch is "on" and the engine 10 is presumably running. Accordingly, lines 32 and 40 are shown broken to indicate the additional devices connected thereto. "Start" position terminal 38 normally feeds only starter motor 14, and therefore is shown connected thereto by a solid line 44, and the other side of said motor is connected to ground 42 by a line 46.

Figure 2:
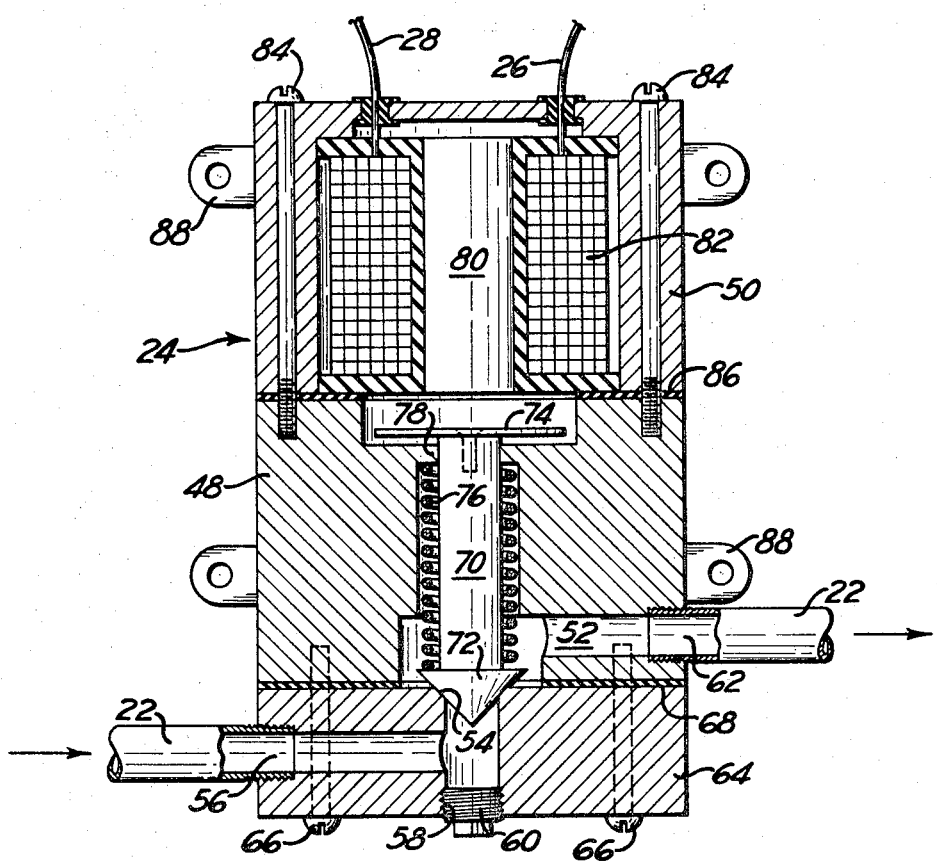
FIG. 2 is a vertical, cross-sectional view through the fuel control portion of the invention.

Referring to FIG. 2, magnetic valve 24 is shown in detail. Valve 24 comprises two basic sections, namely, a liquid handling block portion 48 and an electrical portion 50. Fluid handling portion 48 is formed with a fluid passageway 52 formed with a valve seat 54. On the inlet side of valve seat 54 portion 48 is formed with an in-line inlet opening 56 and a center or tank mounting inlet opening 58 shown sealed by means of a plug 60. The other end of passageway 52 is formed with an outlet opening 62. The inlet portion of passageway 52 is formed in a separate member 64 which is held against fluid handling block 48 in sealed relation thereto by suitable screws 66, and a gasket 68.

As shown, valve 24 is arranged "in-line" but it can be easily mounted directly on the fuel tank 16 by transfer of plug 60 from opening 58 to opening 56 and by the addition of a suitable nipple between the fuel outlet opening in the tank and opening 58. Ease of maintenance of the valve 24 of the invention is assured since a worn valve seat 54 is easily replaced by removal of the screws 66 and substitution of a new separate member 64.

Slidably mounted in block 48 is a valve plunger 70 comprising an enlarged sealing portion 72 cooperable with valve seat 54 to shut off fuel flow through passageway 52. The upper end of plunger 70 is provided with a magnetic operating portion or plate 74. Plunger 70 is normally held in the down or sealing position by a compression spring 76, one end of which bears against a suitable ledge on sealing portion 72, and the other end of which bears against a suitable ledge 78 formed in block 48 adjacent the upper end of the plunger 70.

Thus, passageway 52 is normally closed against fluid flow therethrough by the action of spring 76, and is open only upon electrical activation of electrical portion 50 in cooperation with magnetic plate 74.

Electrical portion 50 comprises an electromagnetic coil having a magnetic core member 80 and an electrical winding 82. The coil is held on the block 48 by a plurality of suitable screws 84, and a sealing gasket 86 at the plane of juncture. Electrical portion 50 is a standard item in automotive and other fields.

Thus, the two sections of valve 24 consist of, basically, three parts; electrical portion 50, liquid handling block portion 48, and member 64. This construction provides an advantage in that in the event of a failure, only the effected part of valve 24 need be replaced. The valve is easily assembled and disassembled by the screws 66 and 84.

Many vehicles are stolen by the use of a so-called "jumper wire" across the ignition switch or along the lines 32 and 44. By bypassing the ignition switch, the starter motor 14 can be activated, and the thief can make away with the vehicle once the engine is running. However, with the addition of magnetic valve 24 of the invention, shorting lines 32 and 44 together, wherever it is done on the vehicle, will permit the engine to start, but once the jumper is removed, which must be done to cutout the starter motor after the engine is running, the engine will only move the short distance, the very small amount of fuel in the fuel line between the valve 24 and the carburetor 12 will permit. Thus, the thief would have to short terminals 34 and 36 together and be aware of the existence and location of valve 24, and in any case short out valve 24 in addition to "-jumping" the starter motor 14 in order to drive the vehicle.

The entire valve 24 may be enclosed in a protective and aesthetically desirable outer casing, not shown. In any case mounting means such as vertical mounting lugs 88 as well as horizontal mounting lugs, not shown, are provided to mount the valve on the vehicle adjacent the fuel line or the fuel tank.

Figure 3:
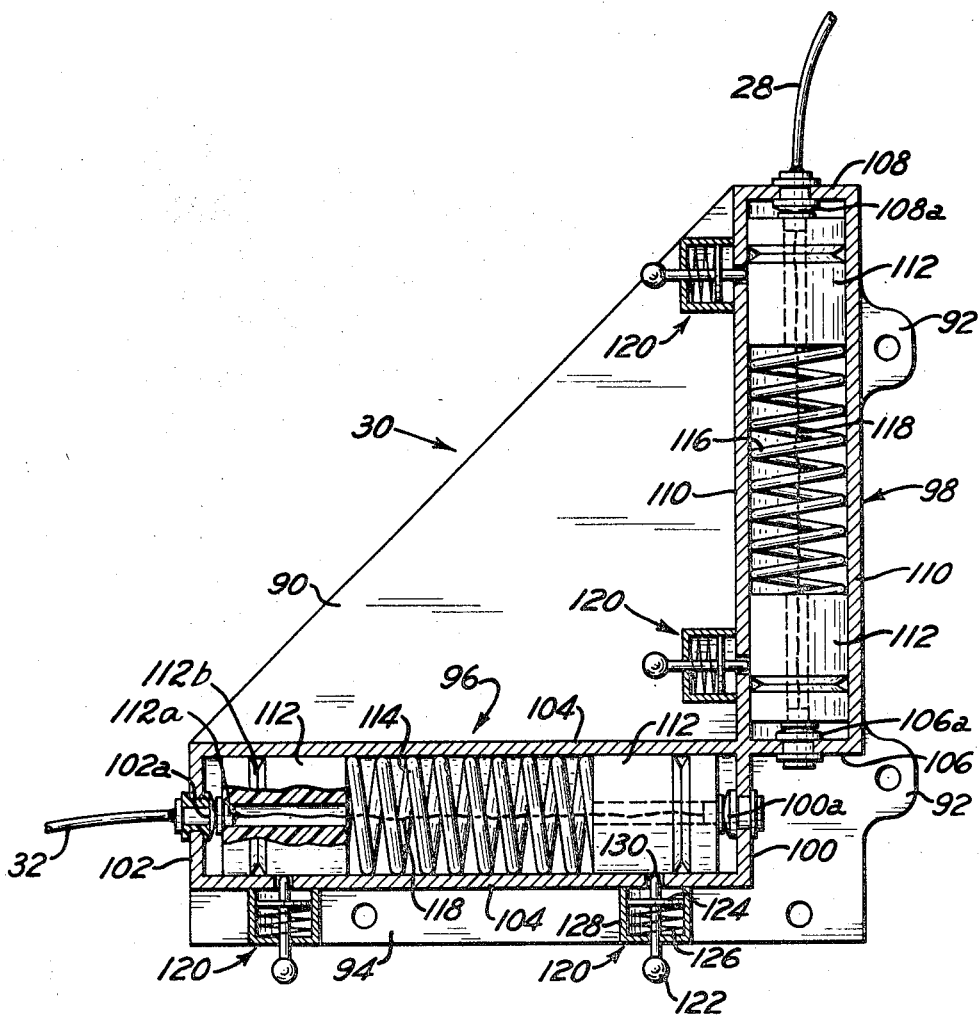
FIG. 3 is a plan view of the inertia responsive portion of the invention, with some parts shown in cross section.

Referring to FIG. 3, inertia-responsive safety switch 30 is shown in detail, and comprises a generally triangular base plate member 90 provided with mounting lugs 92 and a mounting flange 94 adapted to permit mounting of the apparatus 30 in a horizontal position generally centrally on the vehicle. For example, the apparatus could be mounted against the fire wall of an automobile, or under or on the bed of a truck, with a suitable protective cover, of course.

For reference purposes, let it be assumed that flange 94 extends parallel to the axis of the vehicle, and that the perpendicular edge of base 90 carrying lugs 92 is disposed transverse to the axis of the vehicle. A pair of switch block tracks 96 and 98 are provided on base 90 along the two perpendicular edges thereof. Track 96 comprises an inner end plate 100, an outer end plate 102, and a pair of side plates 104. Similarly, track 98 comprises an inner end plate 106, and outer end plate 108, and a pair of side plates 110. Each end plate 100, 102, 106 and 108 carries an electrical contact 100a. 102a, etc. Contacts 100a and 106a are interconnected as by a short wire or the like, not shown. Terminal 102a is connected to line 32, and line 28 is connected to terminal 108a. The end terminals of each track 96 and 98 are interconnected by an inertia responsive assembly comprising a pair of electrically insulating blocks 112 which are urged outwardly away from each other by a compression spring 114 in track 96 and by a compression spring 116 in track 98. Each block 112 is provided with a contact 112a at its outer end surface adapted to contact the end plate contacts 100a, 102a, 106a and 108a, respectively. Each pair of sliding block contacts 112a are electrically connected together by a wire 118 which runs through a suitably formed opening in each block 112 and through the center of the compression springs 114 and 116, respectively.

Two different springs 114 and 116 are used in the two tracks because a larger force is tolerable in the front to rear direction than in the side to side direction due to bumping other vehicles, parking meter posts, and the like with the front and rear bumpers during normal operation. The strength of these two springs is determined dependent upon the weights of the blocks 112, and the friction force between the blocks and their tracks, and the like.

Thus, under normal conditions, a series circuit is established between line 28 and line 32 through the apparatus 30 as follows: contacts 108a, 112a, line 118 in track 98, contacts 112a, 106a, 100a and 112a, line 118 in track 96, and contacts 112a and 102a to line 32. However, in the event of an abnormal condition, such as a severe slide, or an impact from the front, rear, side or any other direction, at least one of the blocks 112 will move in its associated track and away from its end wall contact, thereby breaking the circuit supplying current to the ignition switch and all other devices within the vehicle. Simultaneously with this occurrence, the magnetic valve 24 will have its current supply cut off, and will return to its normally closed fluid flow position, thereby stopping the flow of fuel in the fuel line 22.

In the event of a collision or other abnormal occurrence causing operation of apparatus 30, means are provided to hold the circuit in the broken condition. To this end, each block 112 is formed with a notch 112b which is cooperable with a spring loaded reset pin assembly 120 comprising an operating pin 122 cooperable with notch 112b. A spring abutment 124 is carried by each pin 120. A spring 126 bears against abutment 124, and has its other end bearing against a fixed spring holder bracket 128 extending outwardly from the associated track side walls 104 and 110. Said side walls 104 and 110 are formed with openings 130 adapted to freely pass the pins 122. The distance between the axis of the pin 122 and the notch 112b is predetermined so that the pin will not fall into the notch to hold the circuit open as a result of slight movements of the blocks 112 but will only become operative upon the occurrence of an abnormal condition such as a collision. Once a pin 122 moves into its associated notch 112b, it can only be reset manually, which entails simply pulling the pin out of the notch to permit the spring 114 and 116 to urge the blocks apart again into electrical contact with the track and plate contacts to reestablish the series circuit.

As an additional antitheft device, a selected one of the blocks 112 and its associated reset pin assembly 120 may be provided with means to manually break the circuit. For example, a hidden set of levers or remote control cables could be run from the location of a selected block and reset pin on apparatus 30 to an unobvious position in the cab or passenger compartment of the vehicle, whereby the possibility of a thief driving away with the vehicle is virtually eliminated. Such a thief would first have to short the starter motor, and then be aware of the existence and location of magnetic valve 24 and have the ability to short it, and then be aware of the existence and location of apparatus 30 and have the ability to mechanically operate it to establish a supply of electricity to the distributor, to then finally be able to drive the vehicle.

While the invention has been described in detail above, it is to be understood that this detailed description is by way of example only, and the protection granted is to be limited only within the spirit of the invention and the scope of the following claims.

I claim:

1. In vehicles of the type having an internal combustion engine, and an electrical system including a battery, and a multiposition ignition switch, the combination comprising inertia responsive means wired in series circuit with said battery, and an "on" position on said ignition switch, said inertia responsive means comprising a base portion horizontally mounted on said vehicle, a pair of perpendicular tracks on said base member, each of said tracks comprising a pair of opposed end plates each having electrical contact means thereon, means to electrically interconnect the two inner electrical contacts on the two adjacent perpendicular end plates of said two tracks, a pair of slidable electrically insulating blocks with each of said tracks, means to urge said blocks outwardly away from each other, and electrical conductor means to electrically interconnect electrical contact means on the outer face of each block with each other, whereby said electrical series circuit from the outer end plate of one track is made through said electrical conductor means interconnecting said blocks in said one track, and contactors on said adjacent perpendicular two end plates of said two tracks, the second electrical conductor through the pair of insulating blocks with the other track, to the outer end plate of the second track.

2. The combination of claim 1, said means to urge said blocks outwardly away from each other comprising a first compression spring disposed generally parallel to the axis of the vehicle carrying the apparatus and a second compression spring disposed generally perpendicular to said axis of said vehicle, and said first compression spring requiring a larger force to compress it than said second spring.

3. The combination of claim 1, said inertia responsive means comprising means to hold said series circuit open if said vehicle should be subjected to an abnormal physical shock comprising a notch formed in each of said blocks, a reset pin assembly associated with each of said notches, each of said reset pin assemblies comprising an operating pin carrying an abutment member and a compression spring between said abutment member and a fixed portion of the apparatus, whereby said compression spring normally urges said operating pin towards said notch and will move said operating pin into said notch if said block moves out of contact with its associated track end plate by a predetermined amount.

4. Safety and security apparatus for vehicles of the type having an internal combustion engine, a fuel system including a fuel tank, a fuel supply line from the fuel tank to the engine, and an electrical system including a battery and a multiposition ignition switch, the combination comprising electrically operated valve means positioned in the fuel line to hold said fuel line normally closed except when an electrical portion of said valve means is activated, and inertia responsive means wired in series circuit with said battery, said electrical portion of said valve means, and an "on" position on said ignition switch, said inertia responsive means being adapted to break said series circuit and comprising resilient means to hold said series circuit open if said vehicle should be subjected to an abnormal physical shock and to reset said inertia responsive means to remake said series circuit.

5. The combination of claim 4, said valve means comprising said electrical portion and a fluid handling portion, said electrical portion comprising an electromagnetic coil; said fluid handling portion defining a fluid passageway comprising an orifice, a fluid outlet on one side of said orifice, and a fluid inlet on the other side of said orifice; and a valve closure member cooperable with said orifice and operable by a magnetic member associated with said electromagnetic coil to open said orifice upon activation of said coil, whereby said valve means may be connected directly to said fuel tank or in said fuel line.

6. The combination of claim 5, a second fluid inlet on said other side of said orifice, and means to plug at least one of said inlets, whereby said valve means may be connected directly to said fuel tank or in said fuel line.

7. The combination of claim 5, and a spring adapted to hold said valve closure member closed against said orifice.

8. Safety and security apparatus for vehicles of the type having an internal combustion engine, a fuel system including a fuel tank, a fuel supply line from the fuel tank to the engine, and an electrical system including a battery and a multiposition ignition switch, the combination comprising electrically operated valve means positioned in the fuel line to hold said fuel line normally closed except when an electrical portion of said valve means is activated, and inertia responsive means wired in series circuit with said battery, said electrical portion of said valve means, and an "on" position on said ignition switch, said inertia responsive means being adapted to break said series circuit and comprising means to hold said series circuit open if said vehicle should be subjected to an abnormal physical shock, said inertia responsive means comprising a base portion horizontally mounted on said vehicle, a pair of perpendicular tracks on said base member, each of said tracks comprising a pair of opposed end plates each having electrical contact means thereon, means to electrically interconnect the two inner electrical contacts on the two adjacent perpendicular end plates of said two tracks, a pair of slidable electrically insulating blocks with each of said tracks, means to urge said blocks outwardly away from each other, and electrical conductor means to electrically interconnect electrical contact means on the outer face of each block with each other, whereby said electrical series circuit from the outer end plate of one track is made through said electrical conductor means interconnecting said blocks with said one track, the contactors on said adjacent perpendicular two end plates of said two tracks, the second electrical conductor through the pair of insulating blocks with the other track, to the outer end plate of the second track.

9. The combination of claim 8, said means to urge said blocks outwardly away from each other comprising a first compression spring disposed generally parallel to the axis of the vehicle carrying the apparatus and a second compression spring disposed generally perpendicular to said axis of said vehicle, and said first compression spring requiring a larger force to compress it than said second spring.

10. The combination of claim 8, said means to hold said series circuit open on said inertia responsive means comprising a notch formed in each of said blocks, a reset pin assembly associated with each of said notches, each of said reset pin assemblies comprising an operating pin carrying an abutment member and a compression spring between said abutment member and a fixed portion of the apparatus, whereby said compression spring normally urges said operating pin towards said notch and will move said operating pin into said notch if said block moves out of contact with its associated track end plate by a predetermined amount.

11. In vehicles of the type having an internal combustion engine, a fuel system including a fuel tank, a fuel supply line from the tank to the engine, and an electrical system including a battery and a multiposition ignition switch, the combination comprising valve means comprising an electrical portion and a fluid handling portion, said electrical portion comprising an electromagnetic coil wired in series circuit with said battery and an "on" position on said ignition switch, said fluid handling portion defining a fluid passageway comprising an orifice, a fluid outlet on one side of said orifice, and a fluid inlet on the other side of said orifice; a valve closure member cooperable with said orifice and operable by a magnetic member associated with said electromagnetic coil to open said orifice upon activation of said coil, and a second fluid inlet on said other side of said orifice and means to plug at least one of said inlets, whereby said valve means may be connected directly to said fuel tank or in said fuel line.

12. The combination of claim 11, and a spring adapted to hold said valve closure member closed against said orifice.